Patented Mar. 8, 1938

2,110,833

UNITED STATES PATENT OFFICE 2,110,833

PRODUCTION OF STYRENES

Hermann Mark, Mannheim, and Carl Wulff, Ludwigshafen-on-the-Rhine, Germany, assignors to I. G. Farbenindustrie Aktiengesellschaft, Frankfort-on-the-Main, Germany No Drawing. Application July 18, 1930, Serial No. 468,995. In Germany August 8, 1929

2 Claims. (Cl. 260—168)

The present invention relates to the production of styrenes.

It is well known that ethyl benzene can be converted into styrene by heating, but the yields are entirely unsatisfactory.

We have found that styrenes, that is styrene, its homologues and polymers, are obtained in good yields by bringing one or more aromatic hydrocarbons, having at least one aliphatic side chain with at least 2 carbon atoms, in the form of vapor, or gaseous mixtures containing the same, into contact at an elevated temperature with a dehydrogenation catalyst. As suitable catalysts may be mentioned metal compounds difficultly reducible by hydrogen, in particular metal oxides or metal sulphides, or materials containing the same, such as the oxides of calcium, lithium, strontium, magnesium, beryllium, zirconium, tungsten, molybdenum or uranium or other metal compounds which are not converted into the metals under the conditions of working as for example chromium phosphate, calcium aluminate, magnesium chromate or calcium uranate, further anthracite, or deposits of a similar nature occurring in the thermal destruction of gaseous hydrocarbons, active carbon, silica gel, pieces of clay and like heat resisting superficially active substances or mixtures of these substances with each other or with the aforesaid catalysts, phosphates or phosphoric acid. The addition of small amounts, such as from about 1 to 3 per cent by weight of the catalytic substance, of metal compounds which are reducible under the reaction conditions, as for example copper or iron oxides, frequently increases, however, the activity of the catalysts. The catalysts may also be advantageously employed on carriers such as active carbon or silica gel. The said catalysts have a particularly long working life when they have been pretreated at elevated temperatures, such as from about 400° to 800° C. with volatile hydrocarbons such as ethylene or benzine. It is preferable to operate at temperatures between 500° and 800° C. and while adding an inert gas such as nitrogen or methane or, preferably, carbon dioxide or steam which do not attack the initial material. It is also preferable to carry out the reaction in apparatus of such material, as for example porcelain or a copper manganese alloy, that the deposition of carbon and the setting up of the water gas equilibrium are prevented as far as possible. When working up the reaction product for example by distillation the styrenes can be obtained in pure state but the styrenes may be first obtained in the form of a resinous polymerization product which, by thermal decomposition, furnishes the styrene or its homologues. The unconverted initial material is returned again to the process.

When the catalysts employed have been pretreated with gases containing carbon, cracking may occur in the aliphatic chain of those aromatic hydrocarbons which possess an aliphatic side chain with more than two carbon atoms. Such cracking leads to the formation of methane and high molecular condensation products.

The formation of the said high molecular products can be avoided and the process according to the present invention can be carried out in an especially advantageous manner, in particular at temperatures near the lower limit of the aforesaid, say at between 500° and 620° C., with better yields per unit of space and time and without by-reactions by cracking and condensing, by subjecting the catalysts to be employed to a pretreatment with gaseous substances free from carbon at elevated temperatures, such as from about 300° to 600° C., whereby, apparently, their surface is favorably modified. It is preferable to heat slowly the catalysts to the reaction temperature as such or in the presence of water vapor, nitrogen, hydrogen, ammonia or another gaseous substance. In the case of catalysts containing oxides which are capable of forming oxides of a lower stage of oxidation than that in which they are employed, such as tungsten or molybdenum oxides, reducing gases, such as hydrogen or ammonia are preferably employed, since otherwise the oxides may be reduced to a lower stage of oxidation during working therewith with such a strong evolution of heat that the catalysts are liable to sinter and become reduced in efficiency.

Carrying out the reaction at comparatively low temperatures has the special advantage that no undesirable condensation products are formed. The gas formed during the reaction usually consists of hydrogen and contains sometimes traces of methane.

The following examples will further illustrate how this invention may be carried out in practice, but the invention is not restricted to these examples. The parts are by weight if not otherwise stated.

Example 1

10 parts of ethylbenzene and 20 parts of water are passed at 650° C. over a catalyst in a tube of copper manganese alloy. The catalyst consists of 90 per cent of calcium oxide and 10 per cent of magnesium oxide and has been pretreated at 700° C. with ethylene. A slightly fluorescent brownish oil is obtained in a yield of about 97 per cent of the theoretical yield, 90 per cent of this oil boiling between 125° and 160° C. and containing 33 per cent of styrene. The remaining 67 per cent is unchanged ethylbenzene. The gas formed during the reaction consists mainly of hydrogen together with small amounts of methane.

Example 2

Isopropylbenzene is led at from 630° to 650° C. together with carbon dioxide through a porcelain tube which is charged with pieces of a mixture of aluminium phosphate and magnesium oxide. The catalyst has been pretreated with benzine vapor at 700° C. The product obtained in a yield of about 90 per cent of the theoretical yield, boils to the extent of 90 per cent between 130° and 170° C. and contains about 35 per cent of styrene. The remainder is unchanged isopropylbenzene and a little ethylbenzene. The gas formed during the reaction consists mainly of methane as well as a little hydrogen and ethylene.

Example 3

An oil boiling between 170° and 220° C. and obtained by the action of propylene on benzene is worked in the presence of steam as described in Example 1. Silica gel which has been pretreated with a mixture of acetylene and ethylene at 650° C. serves as the catalyst. A fluorescent oil boiling between 140° and 240° C. is obtained in a yield of 90 per cent. By polymerization the product is converted almost quantitatively into a mass resembling rubber.

Example 4

A mixture of the vapors of each 2000 grams of ethyl benzene and 1000 grams of water together with 1000 litres of nitrogen as a guide gas is led during 20 hours over each litre of a catalyst which consists of a mixture of 2 parts by weight of aluminium oxide, 2 parts by weight of zinc oxide and 1 part by weight of chromium oxide and which has been slowly heated to 580° C. in a current of nitrogen. Up to 95 per cent (calculated on ethyl benzene) of a product is obtained which contains up to 70 per cent of styrene, the remainder being unchanged ethyl benzene and from 2 to 3 per cent of condensed products. The styrene can be easily recovered in pure state by cooling the mixture, if desired after a distillation, to a temperature between from 30° to 60° C. below zero. Traces of ethyl benzene may be then removed by washing the crystals of styrene at the said temperatures with methyl or ethyl alcohol or a similar solvent which does not dissolve styrene at the said temperatures. On the other hand the alcohol or the like may be added to the mixture of styrene and ethyl benzene while cooling to the said temperatures, and after filtering off the crystals of styrene the latter may be washed with some alcohol or the like.

In addition to nitrogen, the final gas contains 30 per cent by volume of hydrogen and 1 per cent by volume of methane. Homologues of ethyl benzene such as ethyl or diethyl toluene may be employed instead of ethyl benzene and naphthyl ethylene can be obtained from ethyl naphthalene.

Example 5

A mixture of the vapors of 1000 grams of ethyl benzene and 2 litres of nitrogen is led at 580° C. during 20 hours over each litre of a catalytic mass consisting of molybdenum oxide finely divided and dispersed on pumice stone, which mass has been pretreated in a current of hydrogen during the course of 24 hours at a temperature rising from 250° to 600° C. The result is practically the same as that described in Example 1.

Example 6

A mixture of the vapors of each 1000 grams of ethyl toluene and of water is led during 20 hours at from 550° to 600° C. over a catalyst of zinc oxide which has been pretreated by slowly heating it to 550° C. with water vapor. The action is practically the same as that described in Example 4. The yield of styrene per 24 hours amounts to about 1½ kilograms per litre of the catalyst.

Example 7

A mixture of the vapors of each 2000 grams of ethyl benzene and 1000 grams of water is led at 600° C. during 20 hours over each litre of a catalyst which consists of 1 part by weight each of tungsten oxide, zinc oxide, alumina and Florida earth and which has been slowly heated to 580° to 620° C. in a current of steam. In addition to unchanged ethyl benzene, styrene is obtained in as good a yield per unit of space and time as described in Example 4. The catalyst remains active for a long time and may be regenerated by a treatment with steam or carbon dioxide at temperatures above 300° C.

Example 8

A mixture of the vapors of equal parts (by weight) of ethyl benzene and water is led over a catalyst of active carbon impregnated with 5 per cent of its weight of lithium hydroxide which has been pretreated with steam at 500° C. Styrene is obtained in a good yield per unit of space and time in addition to unchanged initial material.

Example 9

A mixture of the vapors of 1000 grams of ethyl benzene with 1000 litres of nitrogen is passed at 600° C. over a catalyst which has been prepared by depositing 1 part by weight of molybdenum sulphide on 5 parts by weight of aluminium hydroxide or of Florida earth and has been heated to 300° C. and then, in a current of hydrogen or ammonia, to 600° C. On passing the aforesaid quantities during 24 hours over each litre of the catalyst a reaction product is obtained which contains 30 per cent of styrene and 70 per cent of ethyl benzene.

Example 10

A mixture of equal volumes of vapors of ethyl benzene and of water is passed at from 550° to 600° C. over bauxite which has been pretreated with water vapor at 500° C. A product is obtained in a yield of 95 per cent calculated on the ethyl benzene, which product contains about 70 per cent by volume of styrene together with unattacked ethyl benzene and from about 2 to 3 per cent of higher, condensed hydrocarbons.

Example 11

A mixture of the vapors of 1000 parts by weight each of ethyl toluene and of water is passed at from 530° to 600° C. over active carbon, which has been activated with the aid of phosphoric acid and has been pretreated with water vapor at from 500° to 600° C. A liquid product is obtained in a yield of 95 per cent calculated on the ethyl benzene which product contains about 50 per cent by volume of methyl styrene together with unattacked ethyl benzene and a small quantity of higher, condensed hydrocarbons.

Example 12

A mixture of vapors from 1000 grams of ethyl benzene with 500 litres of nitrogen is passed at 600° C. through a pipe which has been filled with a catalyst prepared by reducing molybdic acid at 500° C. with the aid of hydrogen. A water-white product is obtained in a quantitative yield, the product consisting of 30 per cent of styrene and 70 per cent of unaltered ethyl benzene.

Example 13

1000 parts of diethyl benzene mixed with 1000 parts of water are passed at 600° C. over bauxite. Homologues of styrene are obtained in a yield of from 30 to 40 per cent, the homologues being easily polymerized by heating to 150° C. 90 per cent of the condensate which is not polymerized consists of unaltered diethyl benzene.

Example 14

Over a catalyst consisting of 50 per cent by weight of zinc oxide, 40 per cent of aluminium hydroxide and 10 per cent of calcium oxide, placed in an enamelled reaction vessel vapors from 10 kilograms of ethyl benzene and 10 kilograms of water are passed per litre of the catalyst and during 24 hours at 620° C. A water-white product is obtained in a yield of 98 per cent, 50 per cent of which consists of styrene while the remainder consists of unaltered ethyl benzene and 1 per cent of condensation products.

What we claim is:—

1. In the production of styrenes from vapors of aromatic hydrocarbons, having an aliphatic side chain with at least two carbon atoms and up to two aromatic nuclei, at a temperature between about 500° and about 700° C. the step which comprises contacting said vapors in admixture with a diluent gas selected from steam and carbon dioxide with a dehydrogenation catalyst comprising essentially a metal compound difficultly reducible to metal under the conditions of working.

2. In the production of styrenes from vapors of aromatic hydrocarbons, having an aliphatic side chain with at least two carbon atoms and up to two aromatic nuclei, at a temperature between about 500° and about 700° C. the step which comprises contacting said vapors in admixture with a diluent gas selected from steam and carbon dioxide with a dehydrogenation catalyst comprising essentially a metal compound difficultly reducible to metal under the conditions of working and from about one to three percent its weight of a metal compound reducible under the conditions of working.

HERMANN MARK.
CARL WULFF.